United States Patent [19]

Lindahl

[11] Patent Number: 4,536,384
[45] Date of Patent: Aug. 20, 1985

[54] STABLE SOLUTIONS OF BASIC ALUMINIUM SULPHATE CONTAINING POLYNUCLEATE ALUMINIUM HYDROXIDE SULPHATE COMPLEXES

[75] Inventor: Gertrud M. Lindahl, Helsingborg, Sweden

[73] Assignee: Boliden Aktiebolag, Stockholm, Sweden

[21] Appl. No.: 598,365

[22] Filed: Apr. 9, 1984

[30] Foreign Application Priority Data

Apr. 28, 1983 [SE] Sweden ................... 8302386

[51] Int. Cl.³ .................... C01F 7/74; C01F 7/02
[52] U.S. Cl. .................... 423/556; 423/265; 423/629; 210/716
[58] Field of Search ........... 423/128, 129, 131, 132, 423/265, 556, 625, 629, 630, 626; 210/716

[56] References Cited

U.S. PATENT DOCUMENTS 4,238,347 12/1980 Gancy et al. .................... 423/625
4,388,208 6/1983 Gytel .................... 423/556

FOREIGN PATENT DOCUMENTS 5419 11/1979 European Pat. Off.
17634 10/1980 European Pat. Off.
2630768 12/1980 Fed. Rep. of Germany.
7405237 7/1974 Sweden.
7201333 12/1974 Sweden.
7412965 11/1977 Sweden.
7503641 3/1979 Sweden.
8101830 3/1981 Sweden.
8104148 7/1981 Sweden.
8104149 7/1981 Sweden.
8206206 9/1983 Sweden.
8206207 9/1983 Sweden.
1548620 7/1979 United Kingdom.

Primary Examiner—Gary P. Straub
Attorney, Agent, or Firm—Brumbaugh, Graves, Donohue & Raymond

[57] ABSTRACT

The present invention relates to storage-stable solutions of basic aluminium sulphate containing polynucleate aluminium hydroxide sulphate complexes of the formula

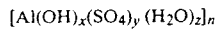

$$[Al(OH)_x(SO_4)_y(H_2O)_z]_n$$

in which x is 0.75-2.0; y is 0.5-1.12; 2x+y=3; and z is >>4, which solutions contain a stabilizing agent in the form of nitrilotriacetic acid, diethylene triaminopentaacetic acid and/or gallic acid.

4 Claims, No Drawings

STABLE SOLUTIONS OF BASIC ALUMINIUM SULPHATE CONTAINING POLYNUCLEATE ALUMINIUM HYDROXIDE SULPHATE COMPLEXES

DESCRIPTION

1. Technical Field

The present invention relates to stable solutions of basic aluminium sulphate containing polynucleate aluminium hydroxide sulphate complexes.

The object of the present invention is to provide a method by means of which stable solutions of basic aluminium sulphate containing polynucleate aluminium hydroxide sulphate complexes can be prepared.

2. Background Art

A number of known aluminium products containing polynucleate aluminium ions in solution are commercially available. These products have been proposed in response to demands for more effective chemicals for use in water-purifying, paper sizing and plant-dewatering processes. Thus, the properties exhibited by polynucleate products are much more favourable to the aforementioned processes than are the monocompounds previously used, owing to the higher electric charge of the metal ions of the polynucleate products. The aluminium products developed with the aim of improving process efficiency in the aforesaid fields are principally of two kinds, namely chloride-based basic aluminium compounds and sulphate-based basic aluminium compounds. Of the first mentioned group there was first developed a polyaluminium chloride (PAC) of the general formula $$[AlCl_x(OH)_{3-x}]_n$$

in which x is $\leq 3$, normally 1–2.

Such compounds, together with their methods of manufacture, are found described, for example, in SE-B-7201333-7, SE-B-7405237-4, SE-B-7412965-1, SE-B-7503641-8 and DE-A-2630768. A common feature of these aluminium chloride containing compositions of the PAC-type based on polynucleate complexes is that extremely complicated methods of manufacture are required if the solutions are to be effective, inter alia when used for water purifying purposes, and hence the solutions are relatively expensive in relation to their effect.

The second type of aluminium-chloride solutions, PALC, which are also based on a content of the same polynucleate complex, have general total formulae which can be written $$[AlCl_3.xAOH]_n$$

in which A is alkali metal, and $$[AlCl_3.(x/2)B(OH)_2]_n$$

in which B is an alkaline earth metal, n is a positive integer, and x is a number in the range of 1–2.7.

Polynucleate aluminium chloride solutions of the PALC-type are found described in FR-A1-7512975, according to which the solutions are produced by alkalizing aluminium chloride solutions with solutions of alkali hydroxide. According to this specification, it has not been possible to produce clear, stable solutions other than when the solutions are in a highly diluted state. By "stable solution" is meant here and in the following a solution which does not change with respect to its composition and its properties, even when stored for long periods of time. Thus, it is stated in the aforementioned specification that it is possible, under certain conditions, to obtain a solution containing up to 0.40 mole aluminium per liter. This solution, however, has a greatly limited stability, and must be injected directly into the water to be purified. It is evident from the specification, and particularly from the Examples recited therein, that solutions having aluminium concentrations higher than about 0.1 mole/l cannot be expected to be more effective and more stable than the known PALC-solutions according to said specification.

Sulphate-based basic aluminium compounds have been described in EP-A-79850039-3, EP-A-80850033-4 and SE-A-8101830-1.

These products contain polynucleate metal ions in solution to a greater or lesser degree, and are thus effective water-purifying agents. The sulphate-based products can also be used for purposes other than water-purification purposes, since the presence of the polynucleate metal ions favours the effects desired.

Examples of such use include the hydrophobization of paper in paper-manufacturing processes, in which an aluminium sulphate and a sizing agent of resin type are added to the stock, the sizing agent becoming fixed to the fibre in a later manufacturing phase, through the agency of the aluminium sulphate. In this respect, it has been found that polynucleate sulphate-based aluminium compounds are superior to mononucleate aluminium sulphate. Polynucleate sulphate-based aluminium compounds have also been found to be splendid retention agents, i.e. agents which increase the amount of solid material retained on a paper web, i.e. such materials as fillers and fibres.

When using the solutions within the aforegiven fields, it is sometimes desirable, and even necessary, to restrict the supply of sulphate ions to the smallest amount possible, particularly when purifying tap water. This is particularly important in systems which are repeatedly used and purified, in order to eliminate the risk of sulphate accumulating in body tissues and in the water, where it is likely to have corrosive effect on concrete. This applies, for example, to certain water-purifying systems in places where the lack of water is so serious that the water available must be re-used to the greatest possible extent, with intermediate purification. Water which has been cleaned ten times with conventional aluminium sulphate, or compositions having corresponding sulphate contents (PALS) can contain so much sulphate that it will attack the pipelines of the system, resulting in troublesome leakages. Problems arising from the enrichment of sulphate ions is even more pronounced in paper-manufacturing processes, where the water system is essentially closed for environmental reasons. The manufacturing processes are seriously affected by excessively high percentages of salt in the paper.

In relation to the sulphate-based composition, the chloride-based aluminium compositions of the PAC- or PALC-type exhibit a number of disadvantages, of which the most usual are the excessively high water-purifying costs with regard to the use of PAC-compositions, and the excessively high chloride contents (twice as high as PAC) when using PALC-compositions, which should be avoided for environmental reasons.

Because of the corrosion risks involved, the chloride-based aluminium compounds are not suitable for paper-manufacturing purposes.

Products containing less sulphate than the PALS products recited above are known from U.S. Pat. No. 4,238,347. These products are able to protective an attractive alternative to the afore-described sulphate-based aluminium compounds, when the sulphate content subsequent to the treatment process constitutes a problem, provided that the solutions can be caused to contain sufficient polynucleates to provide comparable results. The products, however, have an OH/Al-ratio of up to only 1.5, restricted to 1.3 for practical use. This means that the product contains far less polynucleates than for example, the sulphate-based product according to the aforementioned SE-A-8101830-1, and are thus less effective than said product, which means that the products according to U.S. Pat. No. 4,238,347 must be added in larger quantities, rendering the use of such products more expensive and the sulphate-content reducing effect less pronounced.

It is known from SE-A-8104148-5, SE-A-8104149-3, SE-A-8206206-8 and SE-A-8206207-6 to produce basic aluminium sulphate having a polynucleate aluminium hydroxide sulphate complex of the general formula $$[Al(OH)_xSO_4)_y(H_2O)_z]_n$$

in which
x is 0.75–2.0; suitably 1.5–2.0
y is 0.5–1.12; suitably 0.5–0.75
x+2y=3
z is 1.5–4; suitably 1.5–3.0
when the product is in solid form.
Preferably
x=1.6–1.8;
y=0.6–0.7; and
z=2.0–2.5
when the product is in solid form, z=1.5–4, while when the product is in aqueous solution z>>4 and the x- and y-ranges remain unchanged.

It is also known from the last-mentioned patent applications that aqueous solutions of such complexes are not stable, but decompose to form insoluble aluminium salts. As illustrated in these patent applications, sodium citrate/citric acid has a stabilizing effect. Other stabilizing substances than citric acid are α-hydroxy carboxylic acids, tartaric acid, lactic acid, glycolic acid, hydroxy succinic acid. Other stabilizing substances include sodium acetate, carbonates and saccharic acids, and their salts, such as sodium heptonate.

With respect to α-hydroxy carboxylic acids, the stabilizing agent is added in an amount of up to one half equivalent per mole of aluminium.

Sodium heptonate is normally used in an amount of 1–5% of the aluminium complex solution.

DISCLOSURE OF THE PRESENT INVENTION

In accordance with the present invention, there is now provided a further method of stabilizing such solutions of basic aluminium sulphate containing polynucleate aluminium hydroxide sulphate complexes. The novel method is characterized by adding to such a solution an effective amount of gallic acid, nitrilotriacetic acid, and/or diethylene triaminopentaacetic acid.

Other characterizing features of the invention are set forth in the following claims.

The invention will now be described in more detail with reference to a number of examples.

A solution of basic aluminium sulphate containing polynucleate aluminium hydroxide sulphate complexes was prepared in the following manner:

A basic aluminium sulphate solution was prepared, by adding calcium hydroxide to an aluminium sulphate solution so as to precipitate the sulphate, and the resultant precipitate filtered off. The filtrate had the form of $CaSO_4.2H_2O$, gypsum.

The sulphate ions can be precipitated with any acid-soluble calcium compound which separates to form an hydroxyl group, as can any corresponding barium and strontium compound. Thus, it is possible to use CaO, $CaCO_3$ and $Ca(OH)_2$, or corresponding barium or strontium compounds, although CaO and $Ca(OH)_2$ are particularly preferred, especially when concentrated solutions are to be prepared, this latter being preferred.

In order to obtain solutions with high aluminium contents, it is only necessary to add minor quantities of water to the ingoing reactants during the process. For example, lime is mixed with water to form a manageable slurry, implying proportions of 1:1–2 between $CaO:H_2O$. A minor quantity of ingoing aluminium sulphate is slurried with water in the reaction vessel under vigorous agitation, to form a slurry whereafter the lime slurry and a solid or warm, concentrated solution of aluminium sulphate are added to the aforementioned aqueous aluminium-sulphate slurry, either successively or alternately or continuously and simultaneously. When adding the lime slurry and concentrated aluminium-sulphate solution, the pH of the solution shall be kept as low as possible, pH 4, in order to eliminate the risk of precipitating aluminium hydroxide $Al(OH)_3$. In the reaction between aluminium sulphate and lime the chemically-bound water is released in accordance with the following reaction formulae, which exemplify a precipitation of half the sulphate present:

$$2Al_2(SO_4)_3.14H_2O + 3Ca(OH)_2 + H_2O \rightarrow Al_4(SO_4)_3(OH)_6 + 3CaSO_4.2H_2O + 22H_2O + xH_2O$$

in which $xH_2O$ signifies the optional addition of water.

Thus, in the illustrated example, for each calcium there is released $(22/3)H_2O$, which is included as a solvent in the final product, from which it will be seen that as little water as possible should be used when slurrying lime. The process is also exothermic by neutralization heat, and can therefore be carried out without supplying heat to the system. Ambient conditions, however, may favour the supply of heat.

In the temperature range of 70°–90° C., the $CaSO_4$-precipitate is less voluminous, with better filtering properties. This illustrates, among other things, the reason for supplying heat to the process, the temperature preferably being maintained at about 70° C. The solution has a high viscosity at room temperature, and is therefore preferably filtered at a temperature of 70° C. The filtering process used is suitably a pressure-filtering process, since vacuum filtration results in undesirable boiling of the solution, with subsequent uncontrolled evaporation as a result thereof.

In the aforegoing there has been described a preferred method of preparing a solution of basic aluminium sulphate containing polynucleate aluminium hydroxide sulphate complex. The product can also be prepared, however, by metering dry lime to a slurry of the total amount of water and aluminium sulphate.

In a further method, the previously described slurry of aluminium sulphate is produced by mixing a prepared product-solution with solid aluminium sulphate. In this case, the water is added with the lime slurry, which is then thinner and more manageable, although more energy is required for filtering the greater volume of solution.

Combinations of the aforedescribed methods can also be applied.

EXAMPLE A

A basic aluminium sulphate solution was prepared in accordance with the aforementioned preferred process, the input raw material comprising

| Aluminium sulphate | 50.3% (9% Al) |
|---|---|
| Calcium hydroxide | 12.4% |
| Water | 37.3% |

Subsequent to a reaction at 78° C., there was obtained an end product having the following data:

| Aluminium | 6.4% |
|---|---|
| Basicity | OH/Al = 1.7 (=56.5%) |

EXAMPLE 1

0.04 mole nitrilotriacetic acid (NTA) per mole of aluminium was added to a solution according to Example A above, there being obtained a solution which remained stable for more than 10 weeks.

EXAMPLE 2

0.01 mole diethylene triaminopentaacetic acid per mole of aluminium was added to a solution according to Example A above, there being obtained a solution which remained stable for more than 5 weeks.

The same result was achieved when adding 0.02 mole diethylene triaminopentaacetic acid (DTPA) per mole of aluminium.

EXAMPLE 3

0.072 mole of gallic acid per mole of aluminium was added to a solution according to Example A above, there being obtained a solution which remained stable for more than 10 weeks. The solution was turned blue by the gallic acid.

EXAMPLE C1

For comparison reasons a solution according to Example A above was stabilized with sodium heptonate, 0.125 mole sodium heptonate being added per mole of aluminium. This solution remained stable for 7 weeks. The stability of the solution fell correspondingly with reduced quantities of sodium heptonate per mole of aluminium, and with a sodium-heptonate charge of 0.015 mole per mole of aluminium, the solution remained stable for only 2 weeks.

All storage experiments were carried out at a temperature of +20° C.

I claim:

1. A stable solution of basic aluminium sulphate containing polynucleate aluminium hydroxide sulphate complex and a stabilizing agent, characterized in that the stabilizing agent comprises an effective quantity of nitrilotriacetic acid, diethylene triaminopentaacetic acid or gallic acid.

2. A solution according to claim 1, characterized in that it contains nitrilotriacetic acid in an amount of 0.02–0.05 mole per mole of aluminium in the solution.

3. A solution according to claim 1, characterized in that it contains diethylene triaminopentaacetic acid in an amount of 0.01–0.03 mole per mole of aluminium in the solution.

4. A solution according to claim 1, characterized in that it contains gallic acid in an amount of 0.05–0.09 mole per mole of aluminium in the solution.

* * * * *